June 26, 1934.　　　V. FINA　　　1,964,509
VALVE
Filed Dec. 16, 1929
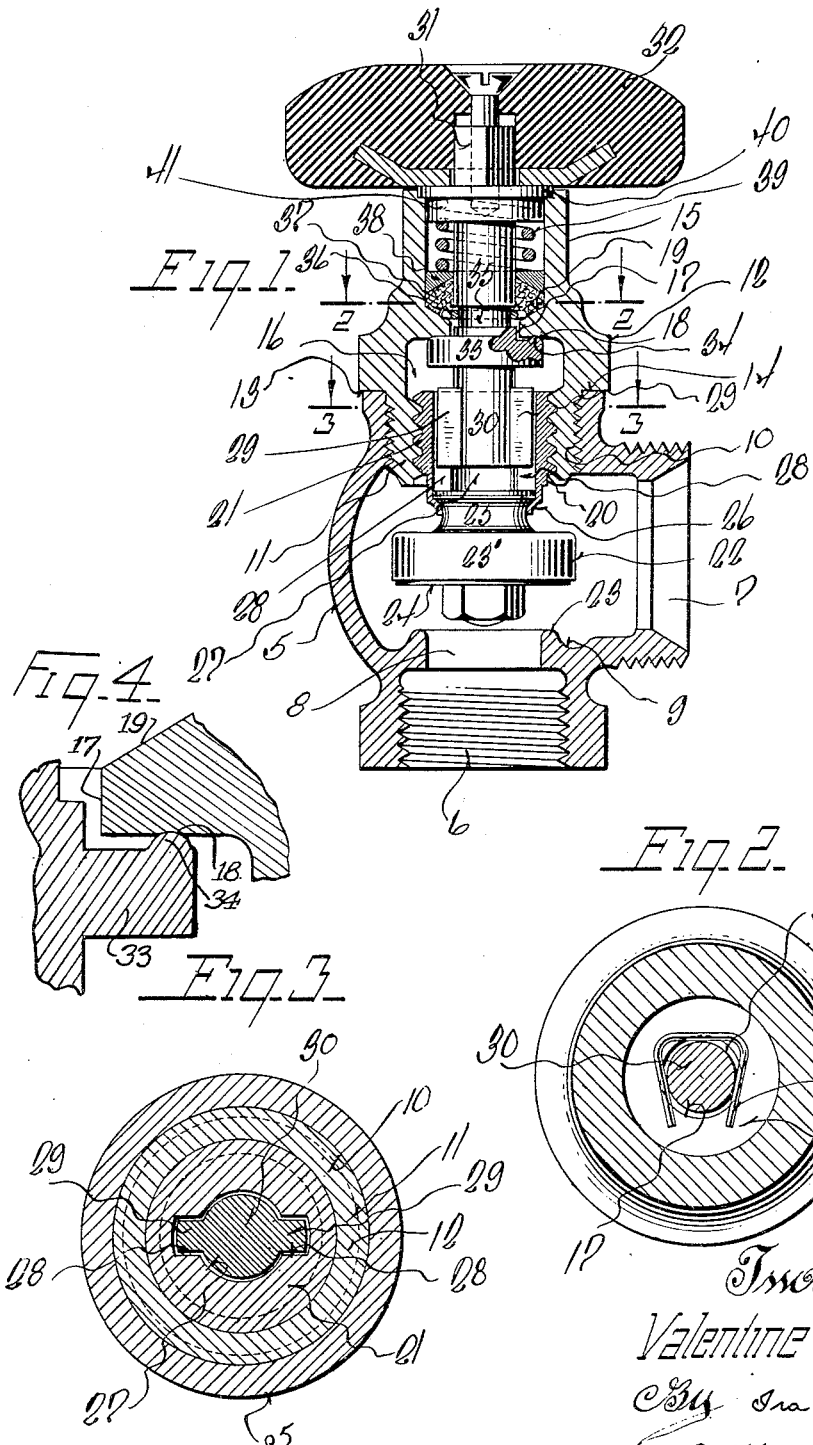
Inventor:
Valentine Fina
By Ira Milton Jones
C. Worney Patented June 26, 1934

1,964,509

UNITED STATES PATENT OFFICE 1,964,509

VALVE

Valentine Fina, Milwaukee, Wis., assignor to Milwaukee Valve Company, Milwaukee, Wis., a corporation of Wisconsin Application December 16, 1929, Serial No. 414,457

1 Claim. (Cl. 251—48)

This invention relates to certain new and useful improvements in valves, of the packless type, and has as an object the provision of an improved structure wherein friction is reduced to a minimum and opening and closing of the valve materially facilitated by a metal to metal packless seat, and which is formed of unlike metals to eliminate binding, wearing and sticking and to assure a positive seal against either gas or liquids.

Another object of this invention resides in the provision of an improved valve structure wherein the movable valve member has a swivel connection with its actuating member to be substantially full floating to assure proper alignment and perfect seating as it closes.

Another object of this invention resides in the provision of an improved bonnet and spring retainer housing having a cooperating member carried by the valve stem to maintain the stem in a true axial position at all times and thus prevent disalignment of the packless valve seating.

And a further general object of this invention is to improve the construction and design of such valves to obtain more efficient and positive operation without added cost.

With the above and other objects in view which will appear as the description proceeds, my invention resides in the novel construction, combination and arrangement of parts substantially as hereinafter described and more particularly defined by the appended claims, it being understood that such changes in the precise embodiment of the hereindisclosed invention may be made as come within the scope of the claim.

In the accompanying drawing, I have illustrated one complete example of the physical embodiment of my invention constructed according to the best mode I have so far devised for the practical application of the principles thereof, and in which:

Figure 1 is a view partly in section and partly in elevation taken vertically through a valve embodying this invention;

Figure 2 is a transverse sectional view through Figure 1 on the plane of the line 2—2;

Figure 3 is a transverse sectional view taken through Figure 1 on the plane of the line 3—3; and Figure 4 is an enlarged sectional view showing the annular groove of seat 18.

Referring now more particularly to the accompanying drawing, the numeral 5 designates a valve casing having an inlet 6 and an outlet 7 adapted to be connected through the valve port 8 of a partition 9 interposed between the inlet and outlet. The open end of the casing 5 opposite the partition 9 is internally threaded, as at 10, in axial alignment with the valve port, to receive the boss 11 of a cap member or bonnet 12 provided with a medial flange 13 adapted to have a snug engagement with the peripheral portion 14 of the valve casing surrounding the opening 10 to form a fluid tight joint therebetween.

The cap or bonnet 12 has a spring retaining housing 15 formed on its upper end which communicates with a bore 16 in the lower portion thereof through a reduced opening 17 which is surrounded at its bottom and top ends by seats 18 and 19, respectively. The lower portion 20 of the bore 16 has a sleeve 21 threaded therein which carries a valve member 22 to and from engagement with a seat 23 surrounding the port 8.

The valve member 22 consists of a cup shaped holder 23' having a valve disc 24 secured therein in the conventional manner and having a boss 25 on its upper end which has a swiveled connection with the lower end of the sleeve 21, the swiveled connection being obtained by swedging the peripheral edge 26 of the sleeve over the boss 25. This manner of connecting the valve member with the sleeve provides a substantially full floating mounting for the valve member and thus assures perfect alignment of the valve disc with the seat 23.

The sleeve plunger 21 has a central bore 27 in axial alignment with the opening 17, from which diametrically opposite guide-ways 28 extend to slidably receive wings 29 projected laterally from a valve stem 30, the lower end of which extends into the bore 27. The upper end of the valve stem 30 passes through the opening 17, and has its end projected beyond the spring retainer 15 and irregularly shaped, as at 31, to non-rotatably receive an operating handle or wheel 32.

A flange 33 medially carried by the valve stem and provided with an annular bead 34 cooperates with the seat 18 which is grooved as best shown in Figure 4 to receive the bead 34, to provide a fluid-tight seal and prevent leakage from the bore 16 through the opening 17. The valve stem and the annular flange 33 are preferably formed of metal unlike that of the bonnet so as to reduce friction to a minimum. An annular groove 35 is also formed in the stem directly above the flange 33 and in alignment with the surface of the seat 19 to receive a snap spring retainer or other means 36 which holds the valve stem assembled with the bonnet.

A molded asbestos ring 37 fits over the valve stem and rests on the seat 19 to serve as a guide for the stem, and a washer 38 engaging the top face of the asbestos ring cooperates with the seat 19 to maintain the asbestos ring under compression of a spring 39 confined between the washer 38 and an upper valve stem guide 40 which has its under surface reduced in diameter, as at 41, to be received within the bore of the spring housing 15. This construction holds the valve stem in exact axial alignment within the bonnet 12 to insure perfect engagement of the seat 18 and bead 34 at all times and efficiently utilizes the action of the spring to hold said parts in engagement.

The manner of transmitting motion from the valve stem to the valve member is similar to that shown in Letters Patent No. 1,675,172 issued John Fraser, Jr., the 26th day of June, 1928, but affords greater flexibility and freedom of action. As the stem is rotated, the sleeve 21 moves with it due to the engagement of the wings 29 in the guideways 28, and its threaded engagement in the bore 20 causes it to move vertically to engage or disengage the valve disc 24 with its seat 23.

From the foregoing description, taken in connection with the accompanying drawing, it will be readily apparent to those skilled in the art to which an invention of the character described appertains that I provide a novel and improved packless valve structure wherein the possibility of binding and the consequent hindrance to free rotary movement is eliminated, and in which the stem is securely held in its proper upright position to insure a perfect fluid-tight seal about the valve stem to prevent leakage therepast, and wherein perfect seating of the valve proper is assured by virtue of its swiveled connection with its actuating sleeve.

What I claim as my invention is:

In a valve of the character described including a bonnet having a transverse medially located apertured wall, said apertured wall dividing the interior of the bonnet into an outer and an inner chamber, a valve stem extending axially through the bonnet with a part received in said aperture of the transverse wall, an annular flange on the stem disposed within the inner chamber, cooperating means carried by the annular flange and the apertured transverse wall to afford a metal to metal fluid-tight connection to prevent communication between the inner and outer chambers, means engaging the stem within the inner chamber and the adjacent surface of the apertured wall to loosely retain the stem assembled with the bonnet, a ring of deformable material surrounding the stem within the outer chamber and resting on the adjacent surface of the transverse apertured wall covering said retaining means, a handle member on the outer end of the stem closing the outer chamber, and a spring coiled about the stem portion within the outer chamber and confined between the handle member and said ring of deformable material to maintain the cooperating means on the stem flange and transverse aperture wall in snug engagement.

VALENTINE FINA.